US006957250B1

(12) United States Patent
Nakano

(10) Patent No.: US 6,957,250 B1
(45) Date of Patent: *Oct. 18, 2005

(54) MAP-INFORMATION PROVIDING SYSTEM USING COMPUTER NETWORK

(75) Inventor: Toshiaki Nakano, Tokyo (JP)

(73) Assignees: Pioneer Corporation, Tokyo (JP); Increment P Corporation, Tokyo (JP)

( * ) Notice: Subject to any disclaimer, the term of this patent is extended or adjusted under 35 U.S.C. 154(b) by 724 days.

This patent is subject to a terminal disclaimer.

(21) Appl. No.: 09/708,561

(22) Filed: Nov. 9, 2000

(30) Foreign Application Priority Data

Nov. 30, 1999 (JP) .................................. 11-341036
Jun. 6, 2000 (JP) ............................. 2000-169131

(51) Int. Cl.⁷ ........................... G06F 7/00; G06F 17/30
(52) U.S. Cl. ....................... 709/219; 707/104; 701/200
(58) Field of Search ............................... 701/104, 201, 701/200; 707/4, 104; 379/93; 370/360; 709/217, 709/218

(56) References Cited

U.S. PATENT DOCUMENTS

| 5,825,769 | A  | * | 10/1998 | O'Reilly et al. ............ 370/360 |
| 5,948,040 | A  | * | 9/1999  | DeLorme et al. ........... 701/201 |
| 6,263,343 | B1 | * | 7/2001  | Hirono ..................... 707/104.1 |
| 6,477,526 | B2 | * | 11/2002 | Hayashi et al. ................ 707/4 |
| 6,532,475 | B1 | * | 3/2003  | Nakano et al. .......... 707/104.1 |
| 6,577,714 | B1 | * | 6/2003  | Darcie et al. ............ 379/93.17 |

* cited by examiner

Primary Examiner—Viet D. Vu
Assistant Examiner—Dustin Nguyen
(74) Attorney, Agent, or Firm—Arent Fox, PLLC

(57) ABSTRACT

A map-information providing site S1 has a WWW server S1a for displaying a WWW page for making a designation entry for a request to provide a map image to an information terminal T. A map database site S2 has a map-information database S2b storing map image data, a retrieval database S2c storing retrieval data for retrieving map image data corresponding to the designation entry from the map-information database S2b, and a map server S2a comparing the designation entry and the retrieval database S2c to read out the map image data corresponding to the designation entry from the map-information database S2b, and sending it to the information terminal T.

7 Claims, 5 Drawing Sheets

MAP-INFORMATION PROVIDING SYSTEM USING COMPUTER NETWORK

BACKGROUND OF THE INVENTION

1. Field of the Invention

The invention relates to a map-information providing system for providing map information required by a user through a computer network.

2. Described of the Related Art

In recent years, information providing services with the aid of computer networks such as the Internet, an intracompany network system (an intranet) have been explosively expanded as information terminals such as a microcomputer have achieved widespread use.

Such information providing services include a map-information providing service for providing map data required by a user to an information terminal via the computer network.

With the map-information providing service, when a user enter information for designating an address, a name of a facility and/or the like into the information terminal, a database server retrieves a map image corresponding to the designated information entered by the user from a map database which is stored with data of map images in advance, and then provides the data file of the retrieved map image to the user's information terminal via the computer network such as the Internet.

Such map-information providing service is available, for example, when a WWW (World Wide Web) page of a corporation or the like displays a map showing locations of sales offices or the like of the corporation in response to the request of the user.

FIG. 5 shows a conventional map-information providing system through the Internet for offering the aforementioned map-information providing service.

In FIG. 5, reference symbol S1' is a map-information providing site managed by a corporation or the like which provides map information to a user. Reference symbol S2' is a map database site for collectively offering the providing service of the map information.

The map-information providing site S1' and the map database site S2' are connected to an internet I. An information terminal T is connected to the map information providing site S1' and the map database site S2' by means of connecting to the internet I through the public switched phone network and an access server which are not shown.

The map-information providing site S1' is provided with a WWW server S1$a$' for displaying a web page to provide map information to the user information terminal T, and a position information database S1$b$' storing position data representing coordinates (a latitude and a longitude) on a map corresponding to an address, a name of a facility, a telephone number or the like.

The map database site S2' is provided with a map server S2$a$' for retrieving map images to provide the data file of the retrieved map image to the information terminal T, a map-information database S2$b$' storing map image data, and a retrieval database S2$c$' storing retrieval data representing the correspondence between the map image data stored in the map-information database S2$b$' and the position data representing the coordinates on the map.

The information terminal T is a user terminal, which uses an application program referred as a WWW browser so as to receive services of the WWW.

In the above map-information providing system, a user designates the URL (Uniform Resource Locator) for connecting from the information terminal T to the map-information providing site S1' via the internet I, and then input the designation information, e.g. an address or a name of a facility, on the displayed web page to see the required map image. Thereupon, the WWW server S1$a$' of the map-information providing site S1' compares a character string of the entered address or the like with the position database S1$b$'. The corresponding position data is read out and sent to the information terminal T.

The position data is sent from the information terminal T to the map database site S2'.

The map server S2$a$' of the map database site S2' compares the sent position data with the retrieval database S2$c$'. The corresponding map image data is read out from the map-information database S2$b$', and the read-out data file is sent to the information terminal T to display the map image thereon.

The map-information providing system is in no need of storing enormous amounts of map data in particular map-information providing sites S1' because the map database site S2' collectively manages the map image data, and thus the map-information providing system has a feature that the burdens on a corporation or the like who manages the map-information providing site S1' are significantly reduced.

However, with the aforementioned conventional map-information providing system, for example, when a corporation or the like managing a map-information providing site S1' opens its new shop or relocates its existing shop, the need for providing map information in accordance with the new position data arises. In this event, the corporation must update the position information database S1$b$' of the map-information providing site S1' as occasion demands. In consequence, there is a disadvantage that the corporation or the like managing the map-information providing site S1' bears the significant burden of the updating operation.

SUMMARY OF THE INVENTION

The present invention has been made to solve the above problems associated with the conventional map-information providing system.

It is therefore an object of the present invention to provide a map-information providing system through a computer network which is capable of providing the most current map information at all times without a burden on management of a map-information providing site.

To attain the above object, a map-information providing system through a computer network according to a first invention, which is for transmitting map image data corresponding to a designation entry from a map database site to an information terminal for display when the designation entry for a request to provide a map image to the information terminal has been made on an information providing screen presented from a map-information providing site, is characterized in that the map-information providing site has a map-information providing server for displaying the information providing screen for making the designation entry for the request to provide the map image to the information terminal, and in that the map database site has a map-information database storing map image data; a retrieval database storing retrieval data for retrieving the map image data corresponding to the designation entry from the map-information database; and a map server for comparing the designation entry made on the information providing screen with the retrieval database to read out the map image data corresponding to the designation entry from the map-information database, and sending the read-out map image to the information terminal.

In the map-information providing system through the computer network according to the foregoing first invention, when a user connects the information terminal to the map-information providing site through the computer network such as the Internet or an intranet, the map-information providing server of the map-information providing site allows the information terminal to display an image of the information providing screen for providing the map information.

On the information providing screen displayed on the information terminal, the user enters information, e.g. an address or a name of a facility, for designating and requesting a desired map image to be displayed, or selects a desired address or facility's name from a list displayed on the information providing screen. The information of the designation entry is then sent to the map database site by means of passing the map-information providing server, and the like.

On the map database site, the map server compares the sent designation entry of a required information form with the retrieval database to retrieve map image data corresponding to the designation entry. Thereby, the map image data is read out from the map-information database and sent to the information terminal.

Thus, the map image required by the user is displayed on the information-providing screen presented by the map-information providing site.

When a change in correspondence of the map image with the information designated by the user is made in the map-information providing site, the retrieval data in the retrieval database of the map database site is updated. Consequently, a newest map image corresponding to the designation entry by the user is displayed.

As described above, according to the first invention, even when a change in correspondence of the map image with the information designated by the user is made on the map-information providing site, it is possible to always provide newest map information only by updating the retrieval database of the map database site. As a result, the burden on management of the map-information providing site is significantly reduced.

To attain the above object, the map-information providing system through the computer network according to a second invention is characterized, in addition to the configuration of the first invention, in that the retrieval data stored in the retrieval database comprises position data representing the correspondence between the designation entry translated into a required information form and coordinates on a map, and data representing the correspondence between the position data and the map image data stored in the map-information database.

According to the map-information providing system through the computer network of the second invention, the map server of the map database site compares the designation entry by the user with the retrieval database; retrieves position data corresponding to the designation entry from the position data representing coordinates on a map stored in the retrieval database; further retrieves map image data corresponding to the above-retrieved position data from data representing the correspondence between the position data and the map image data; and then reads out the corresponding map image data from the map-information database in accordance with the retrieved result.

To attain the aforementioned object, the map-information providing system through the computer network according to a third invention is characterized, in addition to the configuration of the first invention, in that the retrieval data stored in the retrieval database comprises data representing the correspondence between the designation entry translated into a required information form and the map image data stored in the map-information database.

According to the map-information providing system through the computer network of the third invention, the map server of the map database site compares the designation entry by the user with the retrieval database; retrieves map image data corresponding to the designation entry by user from data representing the correspondence between the designation entry and the map image data; and then reads out the corresponding map image data from the map-information database in accordance with the retrieved result.

The map-information providing system through the computer network according to a fourth invention is characterized, in addition to the configuration of the first invention, in that the information terminal is a mobile terminal having an Internet access function. Hence, it is possible that various kinds of information including map images are available to the user at any place and time.

The map-information providing system through the computer network according to a fifth invention is characterized, in addition to the configuration of the first invention, in that the information providing screen is a World Wide Web page. This allows a desired map image to display on the WWW page provided from the WWW server of the map-information providing site via the Internet.

The map-information providing system through the computer network according to a sixth invention is characterized, in addition to the configuration of the first invention, in that the information providing screen is an information display screen displayed on a display of a mobile terminal having an Internet access function. This allows a desired map image to display on a display of the mobile terminal.

The map-information providing system through the computer network according to a seventh invention is characterized, in addition to the configuration of the first invention, in that the map-information providing server is a corporation server. Hence, it is possible to display related map images when data of a customer list or the like is extracted from the database of the corporation server storing a variety of materials and the like.

A map-information providing system through a computer network according to an eighth invention, which is for transmitting map image data corresponding to a designation entry from a map database site to an information terminal for display when the designation entry for a request to provide a map image to the information terminal has been made on an information providing screen presented from a map-information providing site, is characterized in that a charge of providing the map image data from the map database site is issued to a user of the information terminal. Hence, it is possible to ensure a profit of the management of the map database site.

A map-information providing system through a computer network according to a ninth invention, which is for transmitting map image data corresponding to a designation entry from a map database site to an information terminal for display when the designation entry for a request to provide a map image to the information terminal has been made on an information providing screen presented from a map-information providing site, is characterized in that a charge for providing the map image data from the map database site is issued to management of the map-information providing site. Hence, it is possible to ensure a profit of the management of the map database site.

These and other objects and advantages of the present invention will become obvious to those skilled in the art upon review of the following description, the accompanying drawings and appended claims.

DETAILED DESCRIPTION OF THE PREFERRED EMBODIMENT

Most preferred embodiment according to present invention will be described below in detail with reference to the accompanying drawings.

Figure 1:
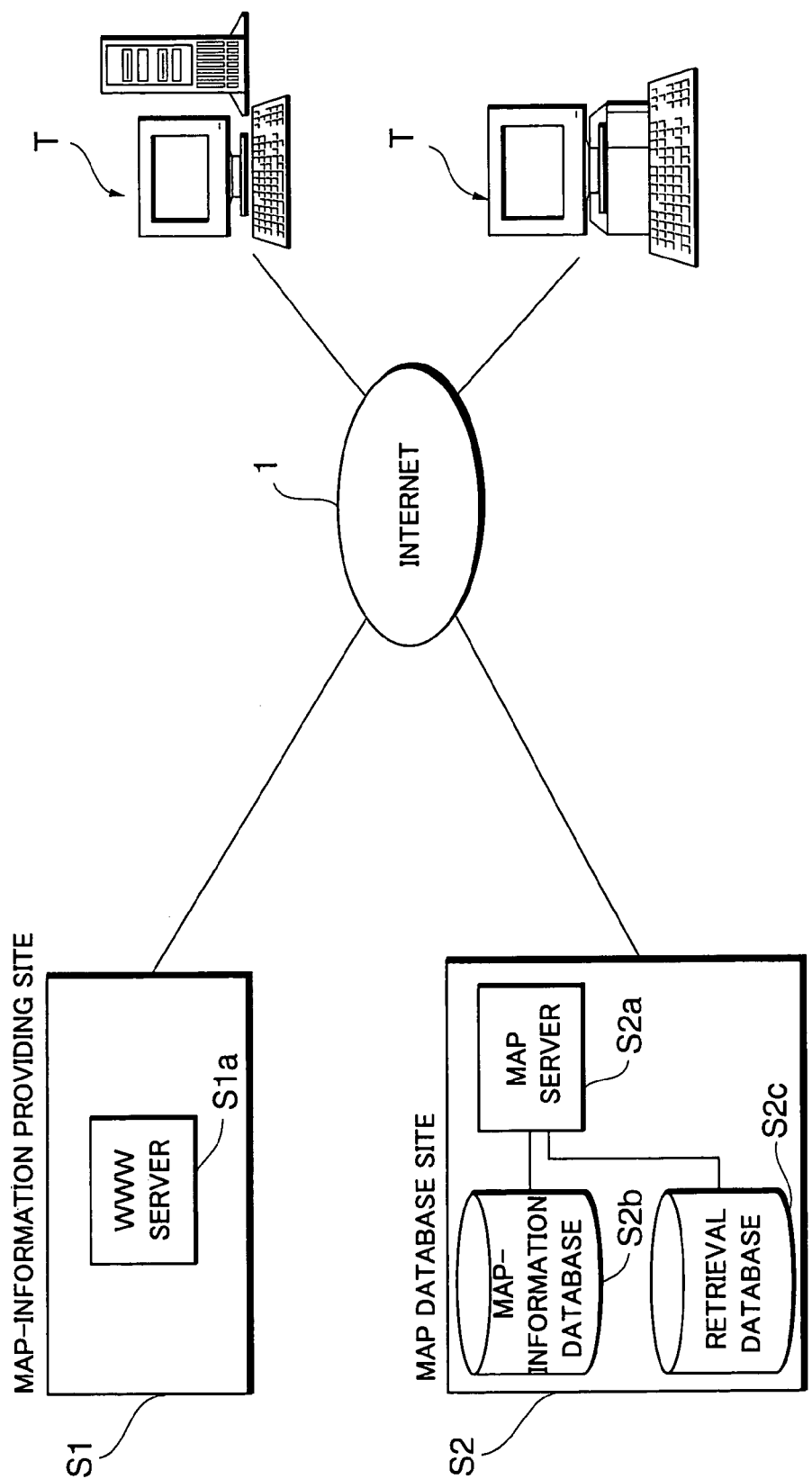
FIG. 1 is a system block diagram showing an example of an embodiment of a map-information providing system through a computer network according to the present invention.

FIG. 1 is a system block diagram showing an example of an embodiment of a map-information providing system according to the present invention.

It should be mentioned that the description is hereinafter presented in the use of the Internet as a computer network by way of example, but it is possible to apply a similar system configuration in use of WAN (Wide Area Network), MAN (Metropolitan Area Network) and an intracompany network system (an intranet) instead of the Internet.

In FIG. 1, an internet I is connected to a map-information providing site S1 managed by a corporation or the like providing map information to users, and a map database site S2 collectively offering the providing service of the map information.

An information terminal T which is a user's terminal uses an application program referred as a WWW browser to receive the service of the WWW. The information terminal T connects to the internet I through the public switched phone network (not shown) and an access server (not shown) so as to access the map-information providing site S1 and the map database site S2.

The map-information providing site S1 has a WWW server S1a displaying a WWW page for providing the map information to the user's information terminal T.

The map database site S2 has a map server S2a retrieving map image data to provide the retrieved map image data to the information terminal T, a map-information database S2b storing map image data, and a retrieval database S2c storing retrieval data representing the correspondence between the designated information for requiring a map image, as will be described later, input to the information terminal T and the map image data stored in the map-information database S2b.

The retrieval database S2c of the map database site S2 stores position data representing coordinates (a latitude and a longitude) on a map in accordance with an address, a name of a facility, a telephone number and/or the like, and data representing the correspondence between the above position data and the map image data stored in the map-information database S2b.

The above map-information providing system offers the providing service of the map image as follows:

Specifically, a user designates URL using the WWW browser to get access to the map-information providing site S1 through the internet I. Thereupon, the WWW server S1a of the map-information providing site S1 sends an HTML (Hyper Text Markup Language) file to an information terminal T to display an image of a WWW page providing the map information.

The user inputs information for designating a desired map image to be displayed, on the WWW page displayed on the information terminal T. For example, when the user wants to know a location of a sales office, located in a specific area, of a corporation providing the WWW page, the user enters a name of the specific area. When the user knows an address or telephone number of the sales office but wants to know the location of the sales office, the user enters the address or telephone number. Alternatively, when the user knows a name of the sales office but wants to know the location thereof, the user inputs the name. The information thus entered and designated is sent to the WWW server S1a of the map-information providing site S1.

The designated information is then translated into HTML text for calling up a map image by the WWW server S1a, and then sent back to the information terminal T.

The HTML text includes URL for allowing the information terminal T to access the map database site S2.

The information terminal T has access to the map database site S2 through the internet I based on the HTML text sent from the map-information providing site S1, to transmit the HTML text to the map database site S2.

The map server S2a of the map database site S2 compares the retrieval database S2c with a character string which represents the designated information of an address or the like entered by the user, included in the HTML text sent from the information terminal T. Then, the map server S2a retrieves position data representing coordinates on a map in correspondence with the character string, and then retrieves map image data in accordance with the retrieved position data from the map-information database S2b to read out.

Then, a file of the map image data read out from the map-information database S2b is transmitted from the map database site S2 through the internet I to the information terminal T. The map image is displayed on the information terminal T for making this information available to the user.

In the above map-information providing system, when a change in the correspondence of the map image with the information designated by the user is made on the map-information providing site S1, for example, when there emerges a need for updating the map image corresponding to the designated information input by the user on the WWW page because a new sales office of the corporation providing the WWW page is opened or an existing sales office thereof is relocated, the position data representing the coordinates on the map corresponding to the address, facility's name, telephone number and/or the like in the retrieval database S2c of the map database S2 is subject to be updated.

For this reason, the retrieval of the map image data is carried out based on the new position data after it is updated. This results in updating the map image to be displayed in correspondence with the designated information entered by the user, on the WWW page provided by the map-information providing site S1.

In the above map-information providing system, the retrieval database S2c stores the position data representing the coordinates on the map corresponding to the address, facility's name, telephone number and/or the like, and the data representing the correspondence between the above position data and the map image data stored in the map-information database S2b. And then, the character string which represents the designated information of an address or the like input by the user, included in the HTML text sent from the information terminal T is compared with the position data representing the coordinates on the map. Furthermore, the position data is compared with the map image data, and then the applicable map image data is retrieved from the map-information database S2b. However, the retrieval database S2c may store the data for comparing between the character string which represents the designated information of an address or the like entered by the user, included in the HTML text, and the map image data, and the map image data may be retrieved directly from the character string representing the designated information.

In addition, the foregoing description is made for the case where the user inputs the address or the like on the WWW server to designate the desired map image to be displayed. However, the WWW server S1a may display a list of the facility's name or the like in an HTML document on the WWW page, and the user can select the desired name of facility on the map image to be displayed from the list, and then a browser of the information terminal T may send the designation entry to the map database site S2, and then the map server S2a may analyze the character string of the address or the like in the designated input sent from the information terminal T to retrieve the corresponding map image data.

Figure 2:
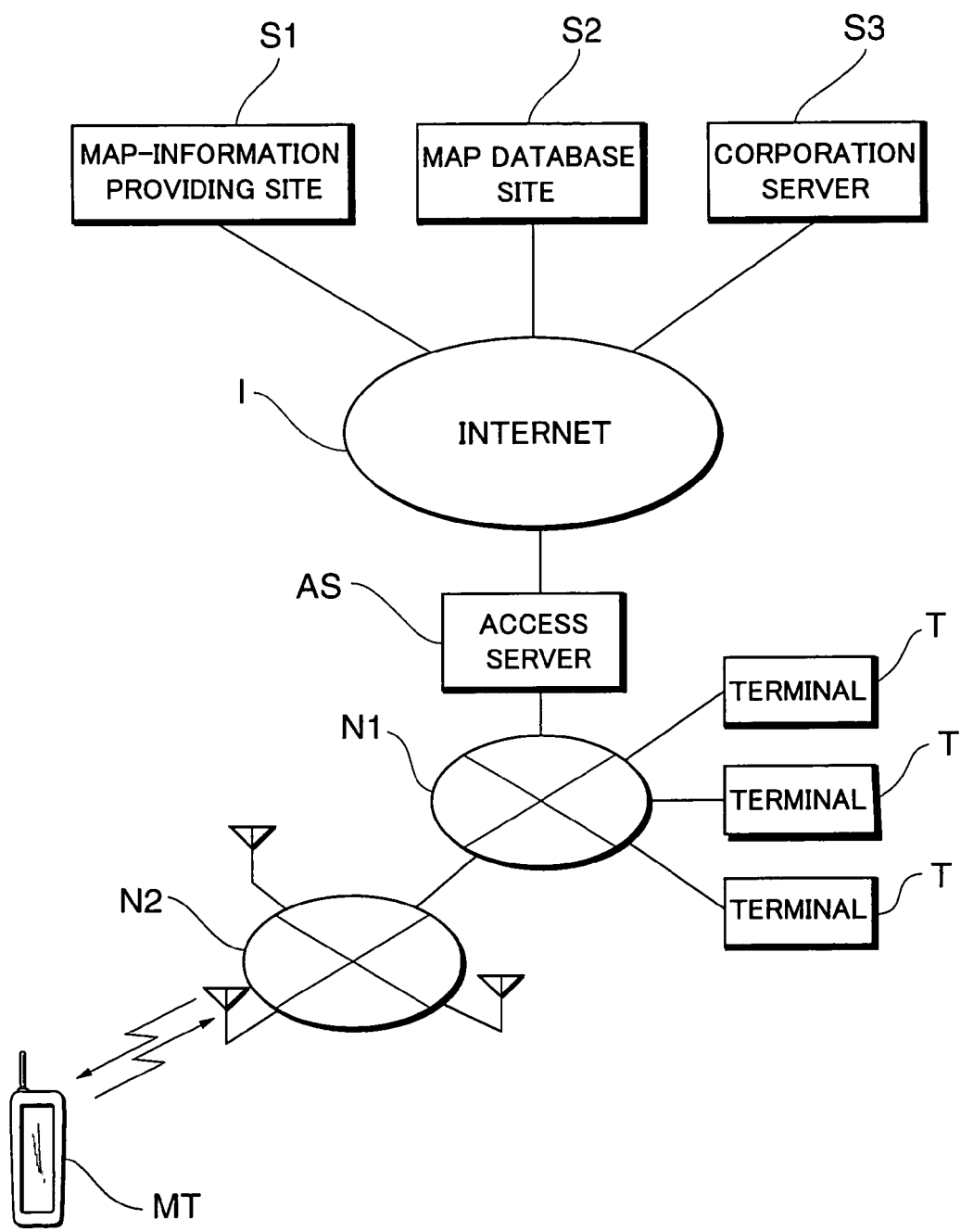
FIG. 2 is a system block diagram showing another example of the embodiment of the map-information providing system through a computer network according to the present invention.
Figure 3:
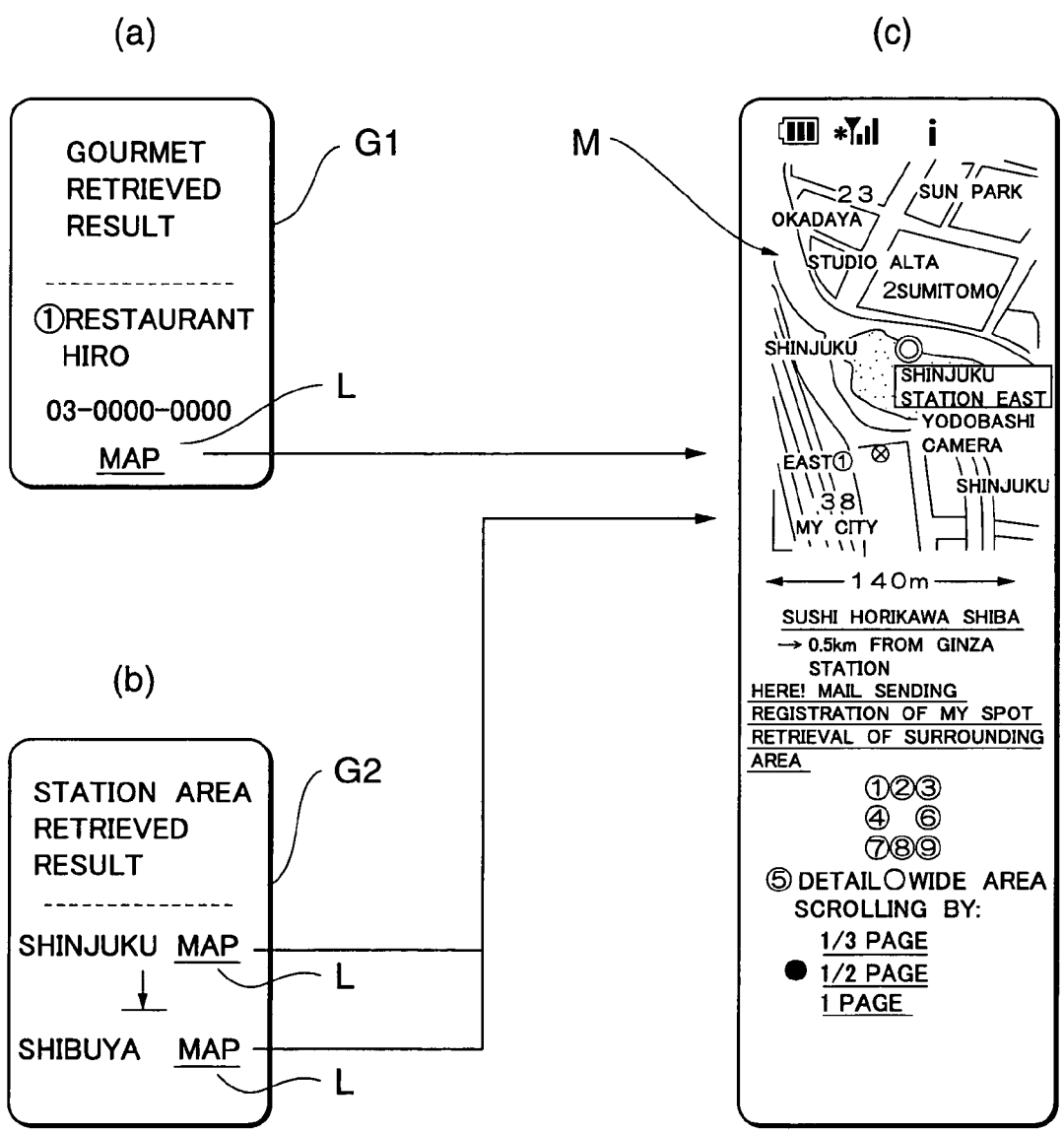
FIG. 3 is an explanatory diagram showing an example of a screen displayed on a display of a mobile terminal in the example.
Figure 4:
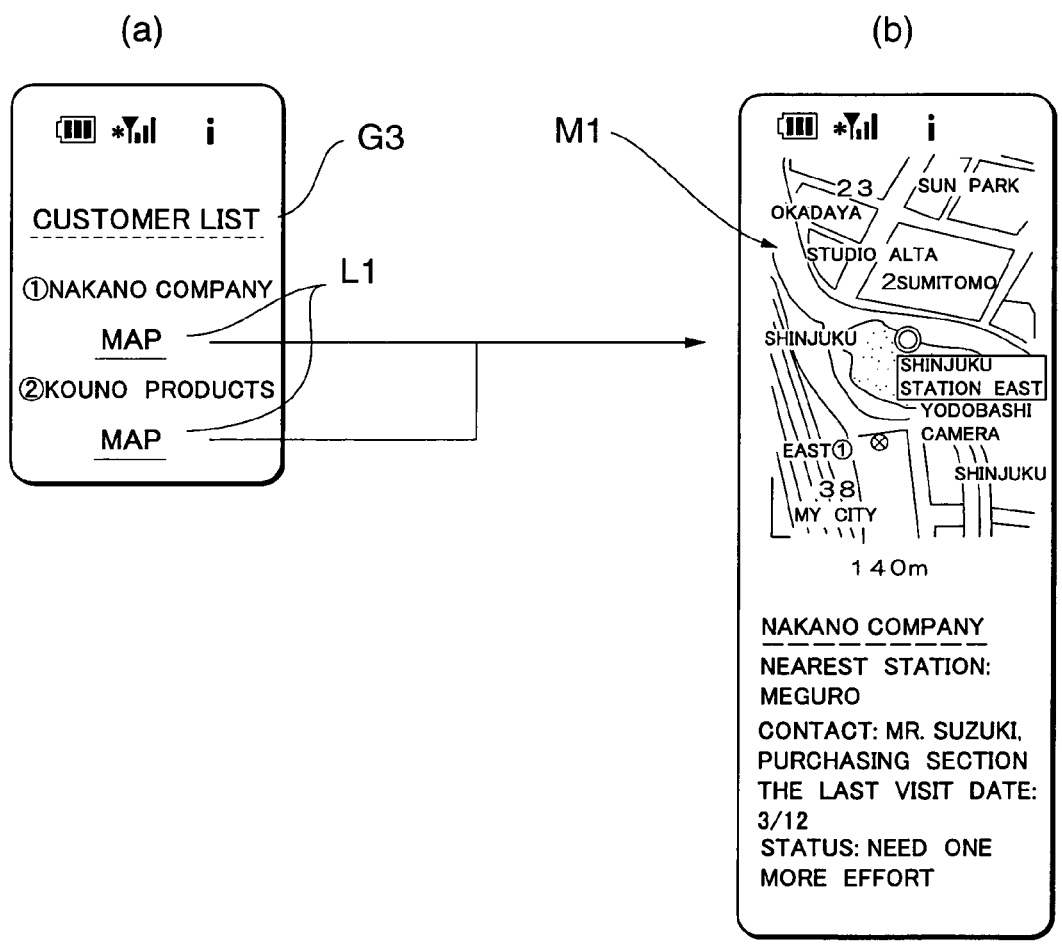
FIG. 4 is an explanatory diagram showing another example of a screen displayed on a display of a mobile terminal in the example.
Figure 5:
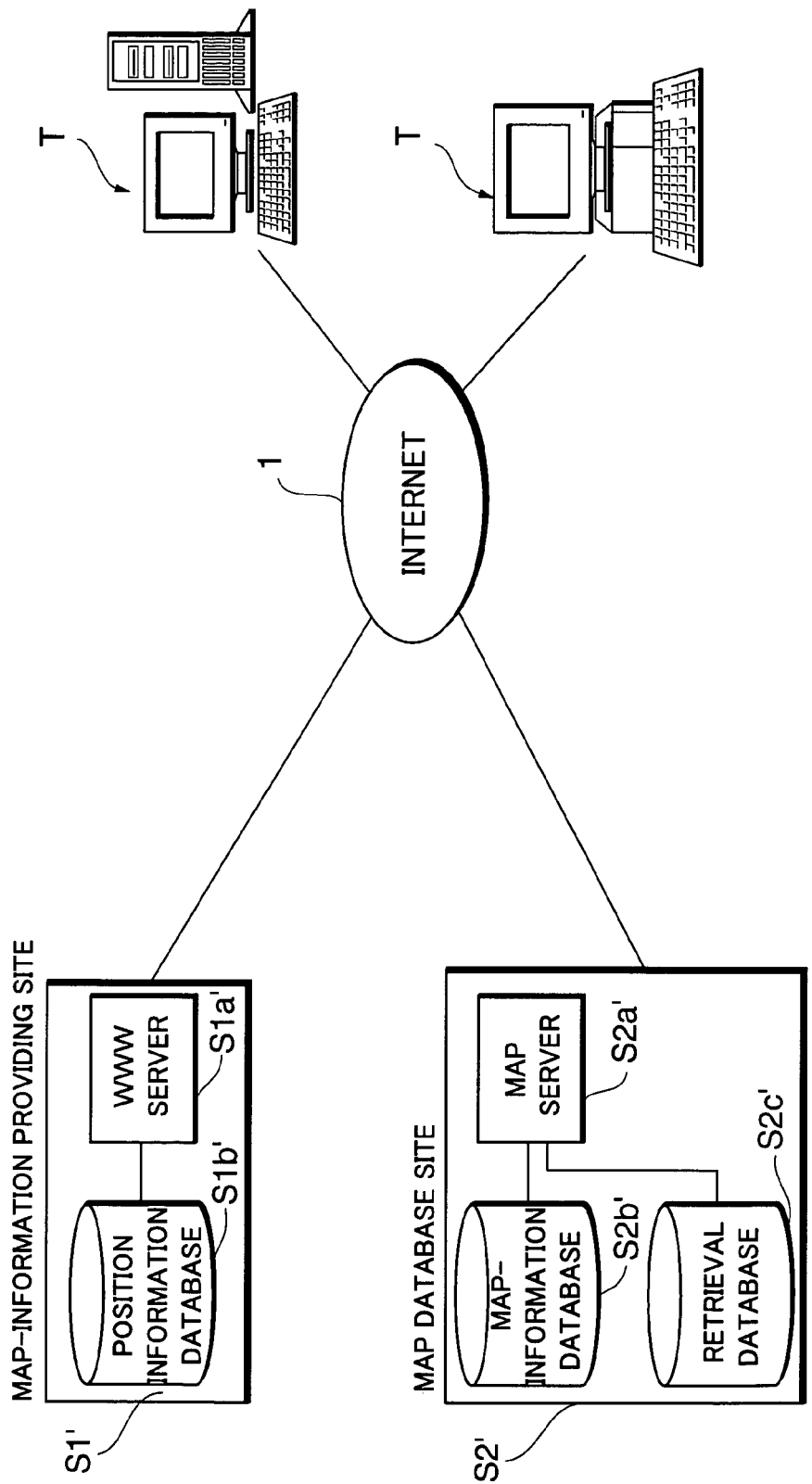
FIG. 5 is a system block diagram showing an example of the prior art.

FIGS. 2 to 4 are the system block diagrams showing another example of the embodiment of the map-information providing system according to the present invention.

FIGS. 2 to 4 shows an example when the map-information providing system according to the present invention is applied to an Internet access service for a cellular mobile telephone (e.g. "i-mode", a trade name).

Specifically, in FIG. 2, each terminal T such as a microcomputer serving as an information retrieval gear is connected to a public switched phone network N1. The public switched phone network N1 is connected to the internet I through an access server AS of the a network service provider (NSP).

The internet I connects to a map-information providing site S1 and a map database site S2.

The configuration up to here is the same as that in FIG. 1. However, in the example of FIG. 2, the internet I is connected to a corporation server S3 and the public switched phone network N1 is connected to a mobile communication network N2. A mobile terminal MT such as PDA (Personal Digital Assistant) or a cellular mobile telephone (e.g. a cellular mobile telephone being ready for "i-mode", a trade name) having an Internet access function, is connected to the map-information providing site S1, map database site S2 and corporation server S3 through the mobile communication network N2.

The corporation server S3 has a database storing intracorporation data of a customer list and the like. For example, when a sales representative connects the terminal T or the mobile terminal MT to the corporation server S3 through the internet I, the required data is sent to the terminal T or mobile terminal MT.

FIG. 3 shows an example of a display screen when the mobile terminal MT accesses to the map-information providing site S1 to receive the providing service for the map information.

Specifically, when the mobile terminal MT is connected to the map-information providing site S1 through the medium of the mobile communication network N2 and public switched phone network N1, information providing screens (e.g. a screen of providing gourmet information, a screen of retrieving the exploration in a station area, and so on) are respectively displayed on a display of the mobile terminal MT based on the image data sent from the map-information providing site S1.

Necessary entries for retrieval are performed on the respective information providing screens, for example, a screen G1 showing the retrieved result for restaurants as illustrated in FIG. 3(a), or a screen G2 showing the retrieved result for the exploration station area as illustrated in FIG. 3(b). In the screen showing the retrieved result, a hyperlink L is embedded for displaying a map.

The user selects the hyperlink L on the screen G1 or G2. Then, the mobile terminal MT is connected to the map database site S2 through the medium of the mobile communication network N2 and public switched phone network N1, to receive the map image data corresponding to each hyperlink L from the map database site S2. Upon reception, the display of the mobile terminal TM displays, for example, a map image M showing an area surrounding the station including landmarks to indicating a position of the restaurant as illustrated in FIG. 3(c), on the display of the mobile terminal TM.

As described above, the user carrying the mobile terminal MT can easily access various kinds of desired information including the map images at any given place and site.

FIG. 4 shows an example of a display screen when the mobile terminal MT is connected to the corporation server S3 to extract data of various materials, e.g. a customer list.

Upon access of the mobile terminal MT to the corporation server S3 through the medium of the mobile communication network N2 and public switched phone network N1, the display of the mobile terminal MT displays a screen G3 showing various materials (a customer list in the example), as illustrated in FIG. 4(a), based on the screen data sent from the corporation server S3.

A hyperlink L1 is embedded for displaying a map in the screen G3. When the user manipulates the hyperlink L1 on the screen G3, the mobile terminal MT is connected to the map database site S2 through the medium of the mobile communication network N2 and public switched phone network N1, to receive map image data corresponding to each hyperlink L1 from the map database site S2. As such, the display of the mobile terminal MT displays, for example, a map image M1 including a location of a customer as illustrated in FIG. 4(b).

As described above, the user carrying the mobile terminal MT can easily access information of, e.g., materials required for a sales activity and the map image associated with the information at any given place and time.

It is needless to say that extracting various kinds of material data including map images from the corporation server S3 can be also carried out by the terminal T such as a desktop personal computer connected to the public switched phone network N1.

The charge for using the map database site S2 as explained above is issued periodically (e.g., on a month-by-month basis) to the user of the terminal T or mobile terminal MT, and the administer of the map-information providing site S1 in the case where the map-information providing site S1 provides information at no charge, and the administer of the corporation server S3 in the case where the corporation server S3 provides information at no charge.

Operation of the aforementioned map-information providing system is performed, for example, through a method allowing reception of map image data from the map database site S2 by means of giving ID to a covenantee on a month-by-month basis and the like.

The terms and description used herein are set forth by way of illustration only and are not meant as limitations. Those skilled in the art will recognize that numerous variations are possible within the spirit and scope of the invention as defined in the following claims.

What is claimed is:

1. A map-information providing system through a computer network for transmitting map image data corresponding to a designation entry from a map database site to an information terminal for display when the designation entry for a request to provide a map image to the information terminal has been made on an information providing screen presented from a map-information providing site,
    wherein said map-information providing site has a map-information providing server for displaying the information providing screen for making the designation entry for the request to provide the map image to the information terminal,
    wherein said map database site has a map-information database storing map image data, a retrieval database storing retrieval data for retrieving the map image data corresponding to said designation entry from said map-information database, and a map server for comparing said designation entry made on said information providing screen with said retrieval database to read out the map image data corresponding to the designation entry from said map-information database, and sending the read-out map image to the information terminal.

2. The map-information providing system through the computer network according to claim 1, wherein the retrieval data stored in said retrieval database comprises position data representing the correspondence between the designation entry translated into said required information form and coordinates on a map, and data representing the correspondence between the position data and the map image data stored in said map-information database.

3. The map-information providing system through the computer network according to claim 1, wherein the retrieval data stored in said retrieval database comprises data representing the correspondence between the designation entry translated into said required information form and the map image data stored in said map-information database.

4. The map-information providing system through the computer network according to claim 1, wherein said information terminal is a mobile terminal having an Internet access function.

5. The map-information providing system through the computer network according to claim 1, wherein said information providing screen is a World Wide Web page.

6. The map-information providing system through the computer network according to claim 1, wherein said information providing screen is an information display screen displayed on a display of a mobile terminal having an Internet access function.

7. The map-information providing system through the computer network according to claim 1, wherein said map-information providing server is a corporation server.

* * * * *